United States Patent [19]
Davey

[11] Patent Number: 5,758,494
[45] Date of Patent: Jun. 2, 1998

[54] SYSTEM AND METHOD FOR ADAPTIVE SWITCH DETERMINATION OF EXHAUST GAS SENSORS

[75] Inventor: Christopher Kirk Davey, Novi, Mich.

[73] Assignee: Ford Global Technologies, Inc., Dearborn, Mich.

[21] Appl. No.: 784,215

[22] Filed: Jan. 16, 1997

[51] Int. Cl.[6] .................................................... F01N 3/20
[52] U.S. Cl. ........................... 60/274; 60/276; 60/277
[58] Field of Search ............................ 60/274, 276, 277

[56] References Cited

U.S. PATENT DOCUMENTS

| | | | |
|---|---|---|---|
| 4,170,965 | 10/1979 | Aono | 123/32 |
| 5,392,599 | 2/1995 | Hamburg et al. | 60/274 |
| 5,396,875 | 3/1995 | Kotwicki et al. | 123/681 |
| 5,544,481 | 8/1996 | Davey et al. | 60/274 |

*Primary Examiner*—Douglas Hart
*Attorney, Agent, or Firm*—Allan J. Lippa; Roger L. May

[57] ABSTRACT

A system and method for compensating for variation in a signal generated by an exhaust gas sensor include determining local maxima and minima of the signal, determining an average difference between local maxima and adjacent local minima, determining an average of the local maxima and an average of the local minima, and modifying at least one parameter based on the average difference, the local maxima average, and/or the local minima average to compensate for variation of the signal generated by the exhaust gas sensor. The modified parameter may include a switching value used to count switches of the sensor signal for monitoring catalytic converter performance or a closed loop fuel control gain value. A sensor switch may be counted for each time period having a difference between an adjacent or consecutive maximum and minimum which exceeds the switching value. Switch ratios are maintained based on both a nominal switching value and the adaptive switching value. One switch ratio is selected for comparison to a failure threshold to indicate degraded catalyst performance.

19 Claims, 3 Drawing Sheets

SYSTEM AND METHOD FOR ADAPTIVE SWITCH DETERMINATION OF EXHAUST GAS SENSORS

TECHNICAL FIELD

The present invention relates to systems and methods for determining a switch of an exhaust gas sensor.

BACKGROUND ART

Increasingly stringent federal regulations limit the permissible levels for emissions. As such, vehicle manufacturers have developed various methods to reduce emissions while improving vehicle performance and fuel economy. Catalytic converters are often used to reduce emission levels of regulated exhaust gases. The conversion efficiency of a catalytic converter may be monitored using a pre-catalyst exhaust gas sensor (such as a HEGO sensor) positioned upstream from the catalytic converter and a post-catalyst exhaust gas sensor (catalyst monitor sensor or CMS) positioned downstream from the catalytic converter. One method known for indicating conversion efficiency of the catalyst is to calculate a ratio of CMS transitions or switches to HEGO transitions or switches. An increasing switch ratio is generally indicative of a degrading catalyst. When the switch ratio crosses a threshold value, a malfunction indicator light (MIL) is illuminated so the vehicle operator will seek service. As such, it is important to properly determine when a HEGO or CMS switch has occurred to reduce unnecessary or premature service indications while eliminating the possibility of a degraded catalyst which does not trigger the malfunction indicator.

For many applications, a HEGO switch is determined when the HEGO sensor signal (or inferred signal where more than one upstream HEGO sensor is utilized) crosses a calibratable threshold. Due to the different character of the CMS signal, a CMS switch may be determined when the CMS signal varies by a calibratable amount within a calibratable time period such as disclosed in U.S. Pat. No. 5,544,481 incorporated here by reference. The upstream and downstream sensor signals may vary in frequency and/or amplitude due to manufacturing tolerances and/or the effects of aging which contribute to error in determining the catalyst conversion efficiency based on a switch ratio.

A number of systems and methods, such as those disclosed in U.S. Pat. Nos. 4,170,965; 5,392,599; and 5,396,875, have addressed the problem of variation in exhaust gas sensor signals by modifying the reference value used to determine a sensor switch. However, these systems and methods apply where a sensor switch is determined based on the sensor signal crossing a switching threshold. Furthermore, the known approaches may unnecessarily adjust the reference point, inducing an error in the catalyst efficiency indication due to short-term changes in sensor output. Such short-term variations may result, for example, from a substandard tank of fuel.

DISCLOSURE OF THE INVENTION

It is thus a general object of the present invention to provide a method and system for accurately determining a downstream sensor switch in the presence of sensor signal variation.

In carrying out the above object and other objects, features and advantages of the present invention, a method for compensating for variation of a signal generated by an exhaust gas sensor positioned downstream from a catalytic converter coupled to an internal combustion engine is provided. The method includes determining local maxima and minima of the signal generated by the exhaust gas sensor, determining an average difference between local maxima and adjacent local minima, determining an average of the local maxima and an average of the local minima, and modifying at least one parameter based on at least one of the average difference, the local maxima average, and the local minima average to compensate for variation of the signal generated by the exhaust gas sensor. The at least one parameter may be a gain used in closed loop fuel control or a switching value used in monitoring performance of the catalytic converter.

In one embodiment, the present invention calculates a switch ratio based on a nominal switching value in addition to a switch ratio based on an adaptive switching value. The latter switch ratio is not used to trigger a malfunction indicator until an appropriate confidence level in the adaptive switching value is attained to eliminate the effect of relatively short-term variation of the sensor signal.

A system is also provided for controlling an internal combustion engine coupled to a catalytic converter. The system includes an exhaust gas sensor in fluid communication with the catalytic converter for generating a signal indicative of presence or absence of oxygen and control logic in communication with the exhaust gas sensor. The control logic monitors the sensor signal to determine signal degradation by detecting changes of at least one parameter of the signal over time. The signal parameter is preferably signal amplitude or frequency. The control logic generates a modified switching value and/or modified closed loop fuel control gains based on the change in the signal parameter over time.

The advantages associated with the present invention are numerous. For example, the present invention provides a consistently accurate indication of catalyst conversion efficiency independent of signal degradation of a downstream exhaust gas sensor. The present invention also enables adaptive fuel control by modifying control gains based on the downstream exhaust gas sensor signal. As such, the present invention maintains optimal engine performance while reducing unnecessary service indications attributed to degraded exhaust gas sensors.

The above object and other objects, features, and advantages of the present invention, will be readily apparent from the following detailed description of the best mode for carrying out the invention when taken in connection with the accompanying drawings.

BEST MODE FOR CARRYING OUT THE PREFERRED EMBODIMENT

Figure 1:
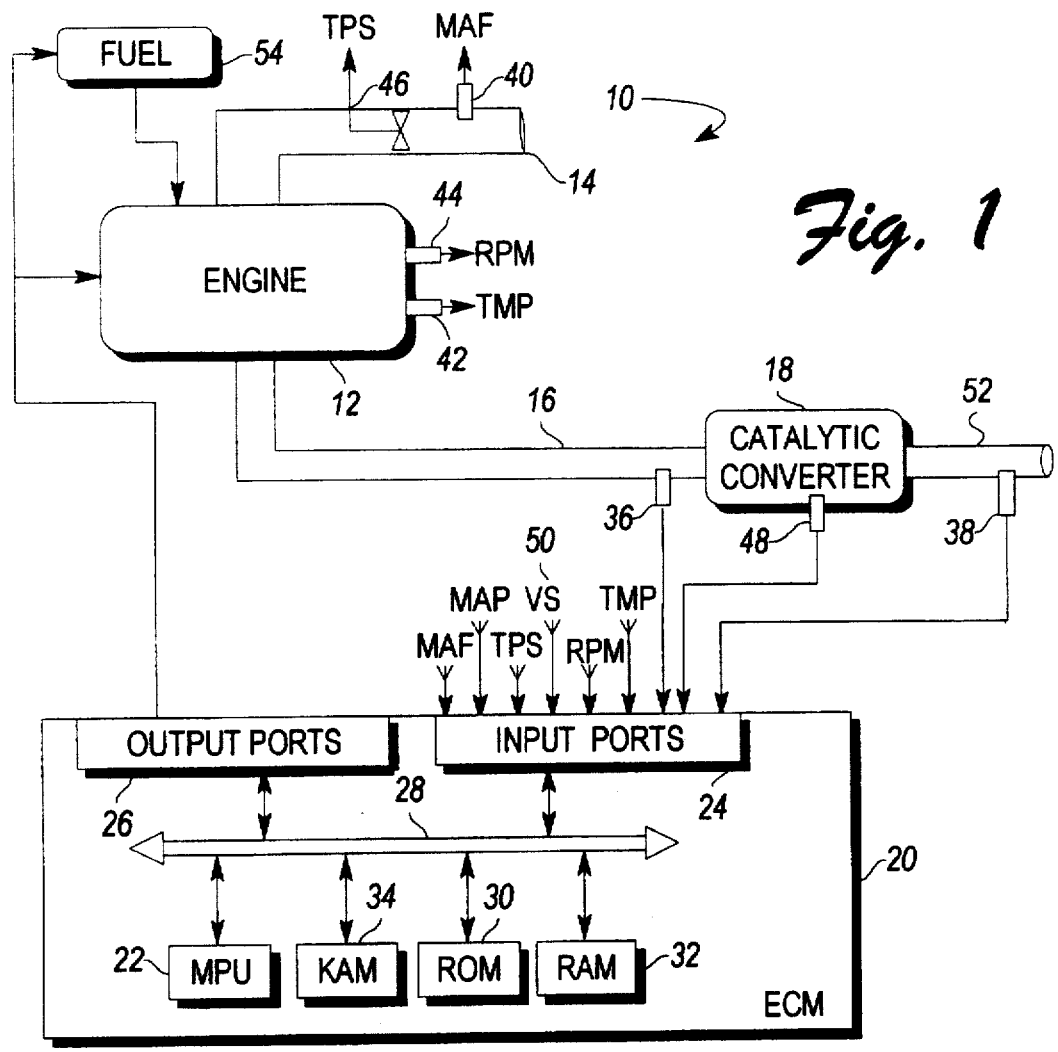
FIG. 1 is a block diagram of a system for compensation for exhaust gas sensor signal variation according to the present invention.

Referring now to FIG. 1, a block diagram illustrating a system for controlling an internal combustion engine by determining an exhaust gas sensor switch is shown. System 10 includes an internal combustion engine 12 having an intake 14 and an exhaust 16. Catalytic converter 18 is fluidly and mechanically connected to exhaust 16 and a downstream section 52. An Engine Control Module (ECM) 20 includes a microprocessor 22 in communication with engine 12 via input ports 24 and output ports 26. Data and control bus 28 provides communication between microprocessor 22, input ports 24, output ports 26 and various computer readable storage media, such as Read-Only Memory (ROM) 30, Random Access Memory (RAM) 32, and Keep-Alive Memory (KAM) 34. The computer readable storage media may be implemented by any of a number of known devices such as ROM, EPROM, EEPROM, flash memory, and the like.

As is known, ROM 30 is a data storage device which contains various program instructions, software, or control logic to effect control of engine 12. ROM 30 may also include various predetermined parameter values relative to operation of engine 12, such as a switch ratio malfunction threshold, proportional and integral gains used during closed loop feedback control of engine 12, various look-up tables, and the like. Because ROM 30 is a non-volatile memory, power is not needed to maintain its contents. In contrast, RAM 32 is used for various working calculations and temporary storage of information. The contents of RAM are lost when power is removed, such as when the ignition key is turned off. KAM 34 is used to store various adaptive or learned parameters and is not reset when the engine is turned off. As such, in one embodiment of the present invention, KAM 34 is used to store sliding averages for maxima and minima of one or more exhaust gas sensor signals as explained in greater detail below. KAM 34 may also be used to store average switch ratio values based on switches counted using a nominal switching value and a modified (adaptive) switching value.

ECM 20 receives signals from various sensors which reflect current operating conditions of engine 12. An exhaust gas oxygen sensor, such as Heated Exhaust Gas Oxygen (HEGO) sensor 36 is used to detect the presence of oxygen in exhaust 16. HEGO sensor 36 communicates with ECM 20 via input port 24. Similarly, Catalyst Monitor Sensor (CMS) 38 monitors the presence or absence of oxygen in downstream exhaust 52 and provides a signal to ECM 20 via input port 24. Mass air flow sensor 40 provides an indication of the mass air flow through intake 14. Temperature sensor 42 provides an indication of the engine coolant temperature while RPM sensor 44 provides an indication of the current engine RPM. Other sensors connected to ECM 20 through input ports 24 may include Throttle Position Sensor (TPS) 46, exhaust gas temperature sensor 48 and Vehicle Speed Sensor (VSS) 50, among others.

ECM 20 uses control logic implemented in hardware and/or software to generate various signals to control engine 12. For example, ECM 20 generates an output signal to control fuel delivered to engine 12 by fuel control 54. ECM 20 controls the quantity and timing of fuel injection in addition to spark timing via signals passing through output ports 26. Temperature sensor 48 may be used to monitor the exhaust gas temperature from which the catalytic converter mid-bed temperature may be inferred.

In operation, ECM 20 is used to control engine 12 and monitor performance of catalytic converter 18 using HEGO sensor 36 and CMS 38. ECM 20 calculates a ratio of observed switches of CMS 38 to observed switches of HEGO sensor 36 after an acceptable number of observed switches of HEGO sensor 36 have occurred, i.e. after a complete monitor cycle or trip. ECM 20 then determines performance of the catalytic converter based on the transition or switch ratio. In one embodiment, the switch ratio is the ratio of observed CMS switches to observed HEGO switches. Because it is difficult to measure the actual emissions levels for regulated exhaust gases, the switch ratio is used as an emissions level indicator. A malfunction or service indicator is energized when the switch ratio exceeds a threshold value. Of course, other emissions indicators or ratios with corresponding threshold values could also be used. After the current cycle has been completed and the current switch ratio has been calculated, the HEGO and CMS counters may be reset for use during subsequent cycles.

While sensor switches may occur continuously during operation of engine 12, switches are observed or counted only when certain global and local entry conditions have been satisfied. This provides a more accurate indication of converter efficiency by monitoring performance only under similar engine operating conditions. The entry conditions are selected to insure that engine 12, catalytic converter 18, HEGO sensor 36, and CMS 38 have reached appropriate operating temperatures. Global entry conditions may include acceptable ranges for air charge temperature, engine coolant temperature, elapsed time in closed-loop operation, and elapsed time from engine start. Local entry conditions may include steady-state part throttle operation and operation within a particular mass air flow range, catalyst temperature range, vehicle speed range, and/or EGR range.

KAM 34 may be used to store various learned (adaptive) or historical data. For example, historical or learned data may include offsets for modifying nominal (predetermined) parameter values based on actual data acquired during operation of the vehicle to adjust to various changes, such as those due to aging or wear. In one embodiment of the present invention, sliding average values for signal maxima and minima of CMS sensor 36 are stored in KAM 34. Average switch ratios based on nominal and adaptive switching values may also be stored in KAM 34. Once an appropriate confidence level is achieved, the switch ratio based on the adaptive switching value, rather than the switch ratio based on the nominal value, is compared to the malfunction indicator threshold to detect degraded catalyst conversion efficiency. If the adaptive switching value is implemented as an offset, the adaptive switching value is combined with the nominal value to generate a modified switching value. The modified switching value is then used to determine the adaptive switch ratio.

Various adaptable parameters may have nominal values which are stored in ROM 30 and then transferred or copied to KAM 34 during operation so that they may be modified. The nominal values are required for initial system operation and in the event that values stored in KAM 34 are lost. KAM 34 may be reset by removing power from the ECM 20 for a period of time sufficient to discharge any capacitive storage elements, i.e. disconnecting the vehicle battery for a period of ten minutes. Certain repairs may also require resetting values stored in KAM 34. In one embodiment of the present invention, a switching value representing a calibratable difference between consecutive minima and maxima of the CMS voltage signal is permanently stored in ROM 30 and copied to KAM 34 for adjustment or modification based on actual engine operation. In another embodiment, only an offset value based on actual engine operation is stored in KAM 34. The offset is combined with the nominal value stored in ROM 30 to produce a modified switching value to determine switches of the exhaust gas sensor(s).

Figure 2:
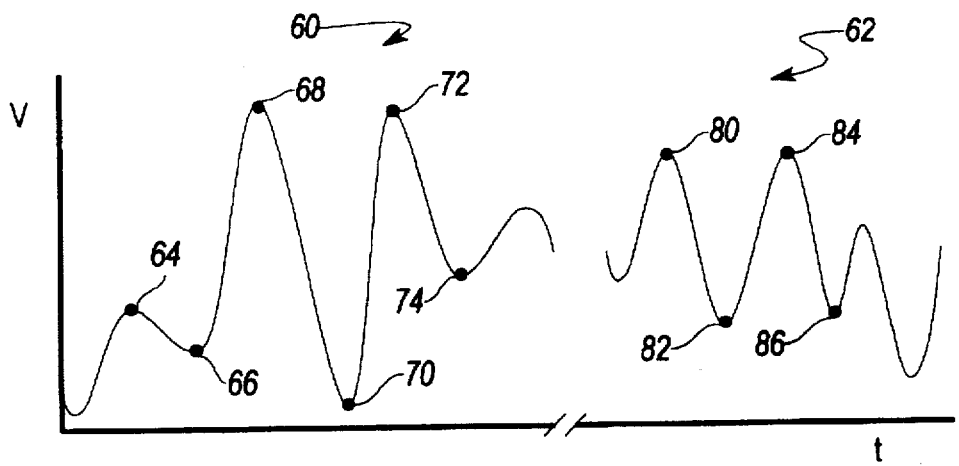
FIG. 2 is a graphical representation of exhaust gas sensor signals and determination of a switching value according to the present invention.

Referring now to FIG. 2, a graphical depiction of a representative exhaust gas sensor signal is shown. Sensor signal 60 represents the signal generated by a properly functioning, nominal output exhaust gas sensor. Sensor signal 62 represents a degraded signal which may be generated by the same sensor as signal 60 after a period of time (t). Alternatively, sensor signal 62 may also represent the signal produced by a sensor having below normal output due to manufacturing variation or any of a number of defects.

Signal 60 is periodically sampled and monitored to determine differences between at least one parameter of the signal over time. Preferably, signal 60 is a voltage signal generated by a downstream exhaust gas oxygen sensor. However, the present invention is applicable to various other types of signals which may be sensed or inferred to monitor the air/fuel mixture provided to the engine or the conversion efficiency of a catalytic converter. Control logic is used to identify relative maxima, such as represented by points 64, 68, 72, 80 and 84. Relative minima, such as represented by points 66, 70, 74, 82 and 86 are also determined and stored in memory such as RAM or KAM. Any of a number of known techniques may be used to identify the maxima and minima of the sensor signals 60 and 62. For example, a peak detector applied to the signal amplitude may be used in conjunction with the first and/or second derivatives to determine maxima and minima.

Once determined, the various maxima and minima may be used to determine whether a switch has occurred. In addition, instantaneous and average switching frequency may also be determined. In one embodiment, a switch is determined by calculating the difference between a relative maximum, such as represented by point 64, and an adjacent or consecutive relative minimum, such as represented by point 66. The difference is then compared to a calibratable switching value. If the difference exceeds the calibratable switching value, then a switch has occurred. Provided various entry conditions have been satisfied, the switch is then counted. Depending upon the particular application, a switch may be indicated by a voltage difference of between about 0.3 and about 0.6 volts between adjacent or consecutive minimum and maximum points.

As depicted in FIG. 2, the difference between points 64 and 66 would not be sufficient to exceed a first switching value and would not be determined to be a switch. In contrast, the difference between points 66 and 68, or the difference between points 68 and 70 would be sufficient to exceed the switching value and would therefore be determined to be a switch. Degraded sensor signal 62 has relative maxima 80, 84 and relative minima 82, 86 which have corresponding lower averages than maxima 68, 72 and minima 66, 70 and 74, respectively. Degraded signal 62, which has a lower voltage swing between maxima and minima, may not be sufficient to exceed the switching value so that one or more switches may not be detected. This adversely affects engine operation by contributing to error in the catalyst monitor and closed loop control. As such, the present invention uses an adaptive switching value to maintain consistent performance in the presence of a degraded signal, such as represented by signal 62.

Figure 3:
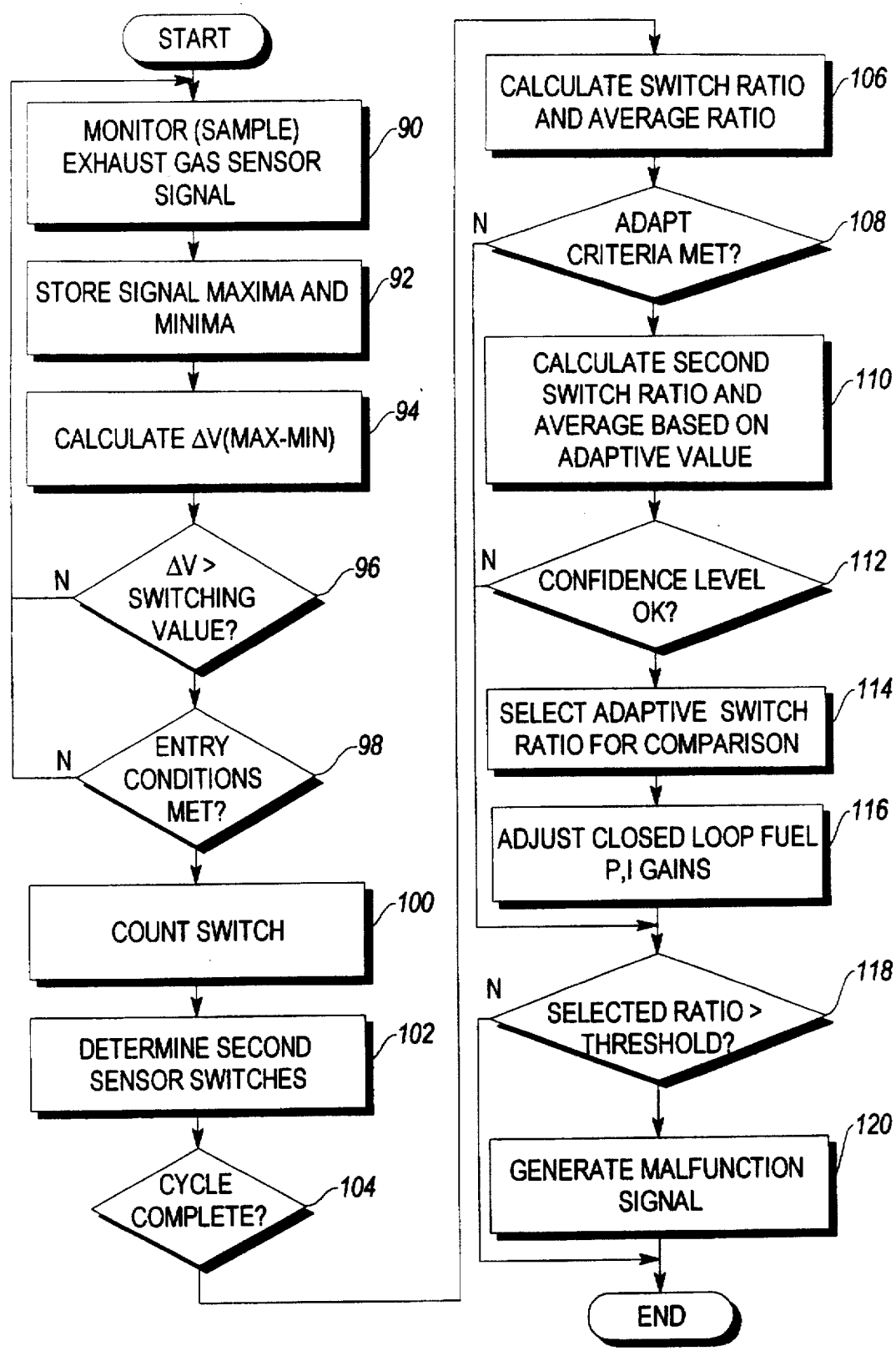
FIGS. 3 and 4 are flow diagrams illustrating operation of a system and method for compensating for exhaust gas sensor signal variation according to the present invention.
Figure 4:
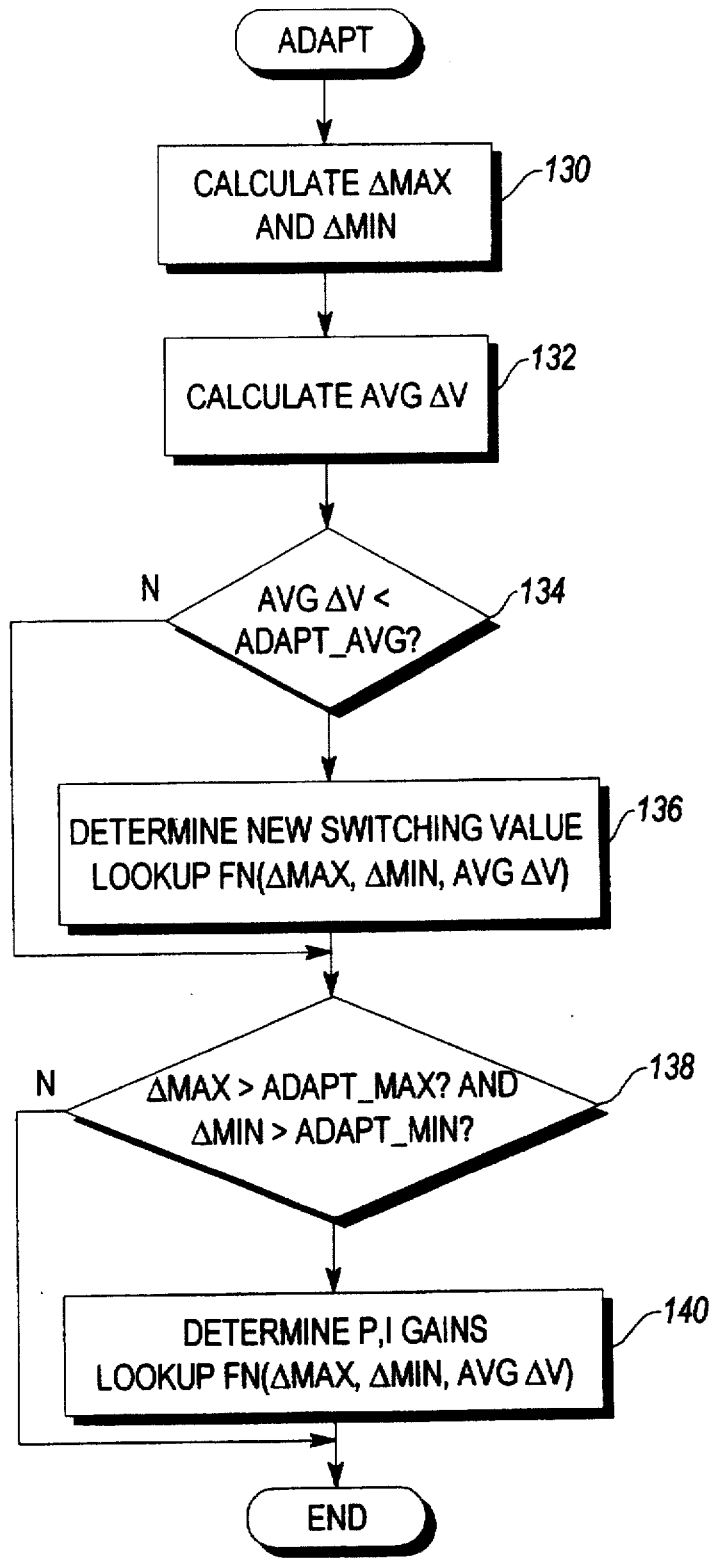

Referring now to FIGS. 3 and 4, flow diagrams generally illustrating operation of a system or method according to the present invention are shown. As will be appreciated by one of ordinary skill in the art, the flow diagrams represent control logic which may be implemented in hardware, software, or a combination of hardware and software. Preferably, the control logic is stored in at least one computer readable medium, such as a PROM, EPROM, EEPROM or a flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. FIGS. 3 and 4 show sequential operation of a system or method for ease of illustration and description only. As such, various programming and processing strategies may be used, such as interrupt driven processing, parallel processing, or the like, depending upon the particular implementation.

Block 90 of FIG. 3 represents monitoring the exhaust gas sensor signal. Preferably, the sensor signal is sampled at an appropriate frequency relative to the response time of the sensor and the control system to detect any switches which occur. The maxima and minima of the signal are determined and stored as represented by block 92. Preferably, this data is stored in keep alive memory (KAM) over a period of several monitor cycles or trips. The difference ($\Delta V$) between adjacent or consecutive maxima and minima is calculated as represented by block 94. For the representative signal 60 of FIG. 2, a voltage difference is determined for each adjacent maximum and minimum, such as maximum 64 and minimum 66, maximum 68 and minimum 70, maximum 72 and minimum 70, etc. The voltage difference is then compared to a switching value as represented by block 96.

If the voltage difference exceeds the switching value, control passes to block 98 which determines whether the appropriate local and global entry conditions have been met. Otherwise, even though a switch may have occurred as indicated by block 96, it will not be counted. Block 100 represents counting a switch where the voltage difference exceeds the switching value and the entry conditions have been met. A current trip count and a total accumulated switch count may be maintained depending upon the particular application.

Block 102 represents the determination of switches for a second exhaust gas sensor signal. The second sensor is preferably placed opposite the first sensor with respect to the catalytic converter. For example, if the first sensor is positioned downstream from the catalytic converter, the second sensor would be positioned upstream, and vice versa. The second sensor switches may be determined in a manner similar to the first sensor, or may be compared to a fixed calibratable switching threshold. Preferably, the present invention is utilized for a downstream sensor which determines a switched based on a sensor parameter change within a definite period of time.

When the current cycle or trip is complete as indicated by block 104, one or more switch ratios are determined as indicated by block 106. To provide a sufficient number of switches for a representative sample, a monitor cycle or trip requires various criteria to be satisfied before being completed. For example, a predetermined number of upstream sensor switches may be required to complete a monitor trip. Once completed, a trip ratio may be calculated as indicated by block 106. The trip ratio may be used to calculate an overall average switch ratio.

Block 108 determines whether various adapt criteria, such as those illustrated and described with reference to FIG. 4, have been satisfied. The adapt criteria indicate that the exhaust gas sensor signal has degraded and that the conditions are appropriate to modify one or more parameters.

Adapt criteria may include verifying the integrity of KAM by computing a checksum or checking a status flag, requiring a minimum number of samples, and determining that the sensor is operating. Preferably, a separate sensor algorithm monitors the sensor signal to determine whether the sensor is functioning. Various tests may be used to detect a short circuit, open circuit, excessive noise, or other faults. Once the adapt criteria have been met, one or more control parameters may be adjusted. For example, the voltage difference required to indicate a sensor switch, i.e. the switching value, may be modified as illustrated in FIG. 4. Similarly, closed loop fuel control gains may also be adjusted.

Referring now to FIG. 4, block 130 of FIG. 4 calculates sliding averages for the relative maxima and minima of the sensor signal. These calculations may be used to monitor changes in the relative maxima and minima over time, or relative to established reference values. For example, block 130 would determine the average value of signal maxima 64, 68 and 72. In addition, the average of the relative minima 66, 70 and 74 would also be determined. These averages may be periodically sampled and compared to subsequent averages to determine signal degradation. As such, a subsequent determination of the signal maxima and minima averages for degraded signal 62 would utilize signal maxima 80 and 84 and signal minima 82 and 86. The maxima average and minima average of signal 62 could then be compared to the previously generated corresponding maxima and minima averages for signal 60 to determine signal degradation. Alternatively, a sliding or rolling average for the signal maxima and a similar average for the signal minima may be continuously calculated using a predetermined number of the most recent observations. This value would then be compared to a reference value to determine whether to adapt the switching value.

Another indication of signal degradation is determined by block 132 which calculates the average voltage difference between adjacent maxima and minima. For example, block 132 generates an average of the difference between points 64 and 66, 66 and 68, 68 and 70, etc. The averages calculated in blocks 130 and 132 are compared to calibratable limits in blocks 134 and 138. Depending upon the particular application, any of the illustrated adapt criteria may be used in isolation or combination with other criteria to determine when to adjust the switching value and/or closed loop control gains.

Block 134 determines whether the average voltage difference between adjacent or consecutive maxima and minima is below a corresponding threshold. For example, when the average voltage difference is below about 0.3 volts, this criterion would be satisfied. Alternatively, a change in the average difference may be monitored over time and compared to an alternative threshold. When the change in average voltage swing exceeds the alternative threshold, this adapt criterion would be satisfied. For example, at time t, the average voltage difference may be 0.6 volts. At time $t_2$, the average difference may have decreased to 0.35 such that the change in the average difference is 0.25. When this change exceeds a corresponding threshold or percentage of the original average difference, this criterion is satisfied. Thus, the average difference may be compared to a previously stored average difference to determine a change in the average distance, or compared to a reference value.

If the adapt criterion of block 134 is satisfied, block 136 determines a new switching value preferably based on the average maximum, average minimum, and average voltage difference. In one embodiment, the new swicthing values are stored in a lookup table referenced by at least one signal parameter based on the signal amplitude or frequency, such as the maxima, minima, average difference, etc. The new switching values may be either relative, i.e. offsets from a nominal value, or absolute.

Block 138 determines whether the changes in maxima and minima exceed corresponding thresholds. If the criteria of block 138 are satisfied, block 140 determines new closed loop feedback gains to adjust operation of the engine to the observed feedback signal. Preferably, block 140 performs a lookup function to select values stored in a lookup tabled referenced by at least one signal parameter in a similar manner as described with reference to block 136. Likewise, block 140 may provide an offset or adjustment rather than an absolute value. In one embodiment, the proportional and integral gains for the closed loop air/fuel control are modified. Signal parameters other than the amplitude may also be used in accordance with the present invention. For example, switching frequency may be used to detect a degraded exhaust gas sensor signal.

Returning now to FIG. 3, a second switch ratio based on the adaptive switching value is calculated as represented by block 110. A corresponding average switch ratio based on the adaptive switching value may also be calculated in addition to the switch ratios (current and average) calculated based on the nominal switching value. Separate switch ratios are preferably maintained to aid in service diagnostics. In one embodiment, the switch ratio calculated using the nominal switching value is used to determine a degraded catalyst until a sufficient confidence level in the adaptive value is achieved as indicated by block 112. Block 112 may include processing of various statistics relative to the modified or adaptive switching value to optimize the ability of the catalyst monitor to detect degraded catalysts. As such, a relatively short term degradation in the exhaust gas sensor signal, such as may be caused by a low-quality fuel, will not trigger a premature service indication.

Once a sufficient confidence level is achieved, the switch ratio based on the adaptive switching value is used to determine whether to generate a malfunction signal as represented by block 114. Block 116 then adjusts the closed loop fuel proportional (P) and integral (I) gains based on the appropriate values as described with reference to FIG. 4.

Block 118 compares the selected switch ratio to a failure threshold to determine whether to generate a malfunction signal as indicated by block 120. The selected switch ratio may represent the current switch ratio corresponding to the last completed cycle or trip, or the average switch ratio. Current switch ratios and average switch ratios based on the nominal switching value and the adaptive switching value are preferably maintained, any one or more of which may be selected for comparison to the switch ratio threshold to determine when to generate a malfunction signal.

Thus, the present invention uses actual data gathered for each vehicle to adaptively determine exhaust gas sensor switches which are used to control fuel delivery and to monitor catalyst efficiency. The vehicle-specific data reduces false or premature service indications while accurately detecting degraded catalyst efficiency to alert the operator. Engine control is improved by detecting a degraded sensor signal used for feedback and providing appropriate compensation.

While the best mode for carrying out the invention has been described in detail, those familiar with the art to which this invention relates will recognize various alternative designs and embodiments for practicing the invention as defined by the following claims.

What is claimed is:

1. A method for compensating for variation of a signal generated by an exhaust gas sensor positioned downstream from a catalytic converter coupled to an internal combustion engine, the method comprising:

determining local maxima and minima of the signal generated by the exhaust gas sensor;

determining an average difference between local maxima and adjacent local minima;

determining an average of the local maxima and an average of the local minima;

modifying at least one parameter based on at least one of the average difference, the local maxima average, and the local minima average to compensate for variation of the signal generated by the exhaust gas sensor.

2. The method of claim 1 wherein the step of modifying includes determing an adaptive switching value, the method further comprising:

counting a sensor switch for each time period having a difference between a local maximum and a local minimum which exceeds the adaptive switching value.

3. The method of claim 2 wherein the engine includes a second exhaust gas sensor positioned upstream from the catalytic converter, the method further comprising:

determining a first switch ratio of counted downstream sensor switches to counted upstream sensor switches based on a nominal switching value; and determining a second switch ratio of counted downstream sensor switches to counted upstream sensor switches based on the adaptive switching value.

4. The method of claim 3 further comprising:

determining a confidence level for the adaptive switching value based on predetermined criteria;

comparing the first switch ratio to a failure threshold if the predetermined criteria are not satisfied; and comparing the adaptive switch ratio to the failure threshold if the predetermined criteria are satisfied.

5. The method of claim 1 wherein the step of determining an average of the local maxima and an average of the local minima comprises:

computing a first sliding average value for a number of previously determined consecutive local maxima; and computing a second sliding average value for a number of previously determined consecutive local minima.

6. The method of claim 1 wherein the step of modifying comprises modifying at least one gain for closed loop fuel control of the engine.

7. The method of claim 6 wherein the step of modifying comprises determining a proportional gain and an integral gain.

8. A system for compensating for variation of a signal generated in response to content of exhaust gas of an internal combustion engine coupled to a catalytic converter, the system comprising:

an exhaust gas sensor in fluid communication with the catalytic converter, the exhaust gas sensor generating an exhaust gas sensor signal indicative of presence or absence of oxygen;

control logic in communication with the exhaust gas sensor for determining local maxima and minima of the signal generated by the exhaust gas sensor, determining an average difference between local maxima and adjacent local minima, determining an average of the local maxima and an average of the local minima, and modifying at least one parameter based on at least one of the average difference, the local maxima average, and the local minima average to compensate for variation of the signal generated by the exhaust gas sensor.

9. The system of claim 8 further comprising:

control logic for determing an adaptive switching value and counting a sensor switch for each time period having a difference between a local maximum and a local minimum which exceeds the adaptive switching value.

10. The system of claim 9 further wherein the exhaust gas sensor is positioned downstream relative to the catalytic converter, the system further comprising:

a second exhaust gas sensor positioned upstream from the catalytic converter; and control logic for determining a first switch ratio of counted downstream sensor switches to counted upstream sensor switches based on a nominal switching value and determining a second switch ratio of counted downstream sensor switches to counted upstream sensor switches based on the adaptive switching value.

11. The system of claim 10 further comprising control logic for determining a confidence level for the adaptive switching value based on predetermined criteria, comparing the first switch ratio to a failure threshold if the predetermined criteria are satisfied, comparing the adaptive switch ratio to the failure threshold if the predetermined criteria are not satisfied, and generating a malfunction signal when the combined switch ratio exceeds the failure threshold.

12. The system of claim 8 further comprising control logic for modifying at least one closed loop gain used in controlling fuel delivery to the engine.

13. An article of manufacture for compensating for variation of a signal generated by an exhaust gas sensor, the article comprising:

control logic for determining local maxima and minima of the signal generated by the exhaust gas sensor;

control logic for determining an average difference between local maxima and adjacent local minima;

control logic for determining an average of the local maxima and an average of the local minima; and control logic for modifying at least one parameter based on at least one of the average difference, the local maxima average, and the local minima average to compensate for variation of the signal generated by the exhaust gas sensor.

14. The article of manufacture of claim 13 wherein the at least one parameter includes an adaptive switching value, the article further comprising:

control logic for counting a sensor switch for each time period having a difference between a local maximum and a local minimum which exceeds the adaptive switching value.

15. The article of manufacture of claim 14 for use in a vehicle having a second exhaust gas sensor positioned upstream from a catalytic converter, the article of manufacture further comprising:

control logic for determining a first switch ratio of counted downstream sensor switches to counted upstream sensor switches based on a nominal switching value; and control logic for determining a second switch ratio of counted downstream sensor switches to counted upstream sensor switches based on the adaptive switching value.

16. The article of manufacture of claim 15 further comprising:

control logic for determining a confidence level for the adaptive switching value based on predetermined criteria;

control logic for comparing the first switch ratio to a failure threshold if the predetermined criteria are satisfied; and control logic for comparing the adaptive switch ratio to the failure threshold if the predetermined criteria are not satisfied.

17. The article of manufacture of claim 13 wherein the article comprises a computer readable storage medium.

18. The article of manufacture of claim 13 wherein the control logic comprises a set of predetermined instructions executable by a microprocessor.

19. The article of manufacture of claim 13 further comprising control logic for modifying at least one closed loop gain used in controlling fuel delivery for an internal combustion engine.

* * * * *